United States Patent
Chinni et al.

(10) Patent No.: US 12,423,194 B2
(45) Date of Patent: Sep. 23, 2025

(54) DISASTER RECOVERY FOR PRIVATE-NETWORK DATA BACKUP AND RECOVERY SYSTEMS

(71) Applicant: Rubrik, Inc., Palo Alto, CA (US)

(72) Inventors: Manjunath Chinni, Saratoga, CA (US); Jonathan Chon, Santa Clara, CA (US); Nicholas De Leon, Porter Ranch, CA (US)

(73) Assignee: Rubrik, Inc., Palo Alto, CA (US)

( * ) Notice: Subject to any disclaimer, the term of this patent is extended or adjusted under 35 U.S.C. 154(b) by 22 days.

(21) Appl. No.: 18/373,854

(22) Filed: Sep. 27, 2023

(65) Prior Publication Data

US 2025/0103444 A1    Mar. 27, 2025

(51) Int. Cl.
     *G06F 11/14*      (2006.01)
     *G06F 11/32*      (2006.01)

(52) U.S. Cl.
     CPC ...... *G06F 11/1469* (2013.01); *G06F 11/1438* (2013.01); *G06F 11/1461* (2013.01); *G06F 11/324* (2013.01)

(58) Field of Classification Search
     CPC ............. G06F 11/1469; G06F 11/1438; G06F 11/1461; G06F 11/324
     See application file for complete search history.

(56) References Cited

U.S. PATENT DOCUMENTS

| | | | | |
|---|---|---|---|---|
| 9,092,248 | B1 * | 7/2015 | Makin | G06F 9/45558 |
| 11,042,309 | B1 * | 6/2021 | Per | G06F 11/1469 |
| 11,397,648 | B2 * | 7/2022 | Wu | G06F 11/1469 |
| 11,474,850 | B2 * | 10/2022 | Yu | G06F 3/0664 |
| 11,875,052 | B2 * | 1/2024 | Meadowcroft | G06F 9/45533 |

* cited by examiner

*Primary Examiner* — Amine Riad
(74) *Attorney, Agent, or Firm* — Holland & Hart LLP

(57) ABSTRACT

Methods, systems, and devices for data management are described. A client of a backup and recovery system may recover a virtual machine (VM) within a private network based on a previously-obtained snapshot of the VM. The VM may host a backup and recovery system for one or more computing objects within the private network prior to a disaster scenario. The backup and recovery system may recover, in response to a trigger, infrastructure of the backup and recovery system based on the snapshot. The infrastructure may include components and core services that operate the backup and recovery system. The core services may be operable to execute independent of other services. The backup and recovery system may subsequently recover data associated with one or more second services provided by the backup and recovery system. The second services may depend on at least one of the core services for execution.

20 Claims, 10 Drawing Sheets

DISASTER RECOVERY FOR PRIVATE-NETWORK DATA BACKUP AND RECOVERY SYSTEMS

FIELD OF TECHNOLOGY

The present disclosure relates generally to data management, including techniques for disaster recovery for private-network data backup and recovery systems.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
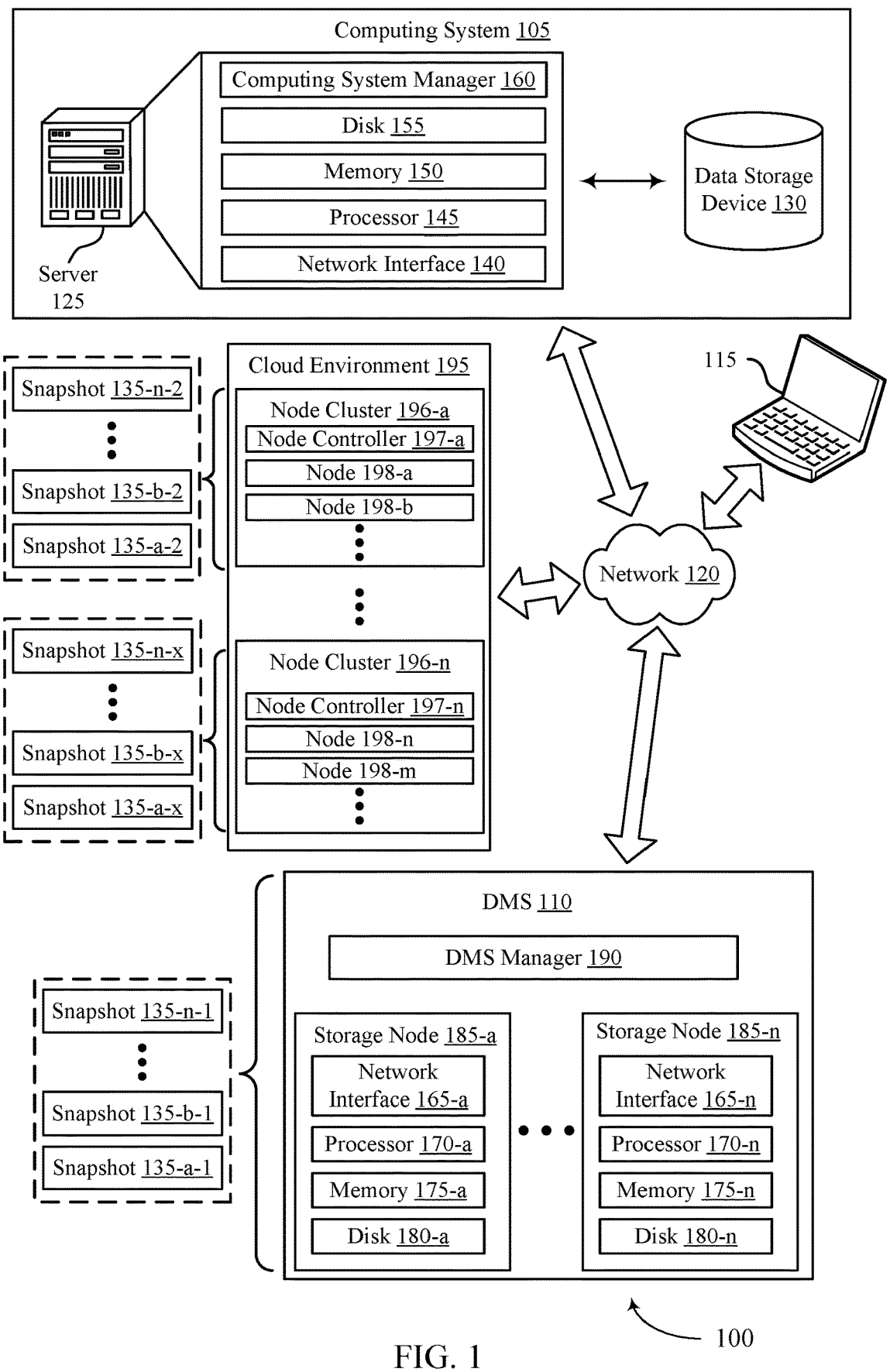
FIG. 1 illustrates an example of a computing environment that supports disaster recovery for private-network data backup and recovery systems in accordance with aspects of the present disclosure.

In some systems, a client may utilize a backup and recovery system that operates within the client's private network. For example, the backup and recovery system may operate on-premise at the client's data center, among other possibilities. The client's private network may not be accessible by or itself be able to access the Internet or other networks, and hence may be referred to as a dark site or dark network, in some examples. The inaccessibility of the private-network data backup and recovery system may present challenges in cases where the system becomes corrupted or otherwise requires recovery (e.g., during a disaster scenario).

Solutions described herein provide for recovery of a private-network data backup and recovery system, including without intervention or other manual support by a provider of the data backup and recovery system or other entity outside the private network. The recovery of the data backup and recovery system may be initiated by a command issued by the client or other entity within the private network, or in some cases the recovery of the data backup and recovery system may be initiated automatically (e.g., periodically or based on a trigger). The recovery may be performed in two phases. A first phase may include recovery of the infrastructure of the backup and recovery system. Infrastructure of the backup and recovery system may include, for example, one or more components (e.g., computing objects, containers, or the like) that are used to operate the backup and recovery system (e.g., used to execute one or more core services as well as applications provided by the backup and recovery system), along with the one or more core services provided by the backup and recovery system. A core service may be a service that can execute independently of any other services. The infrastructure components may be crash-consistent (e.g., able to resume operations without data inconsistencies or errors) based on the infrastructure components storing associated data locally (e.g., in a structured query language (SQL) database, or some other location within a same virtual machine (VM) or other system that hosts the backup and recovery system). The infrastructure-level recovery may thereby include restarting the various infrastructure components and performing health checks. If a health check fails, the recovery may be stopped.

A second phase may include an application level recovery. The application level recovery may be performed after the infrastructure is recovered successfully. The application level recovery may include recovering individual services (e.g., applications) that are run by the backup and recovery system. Execution of these application level services may depend on one or more of the core services, which is why the application level recovery may be performed after successful recovery of the infrastructure. The application level recovery may be performed application-by-application and may include executing one or more jobs per application to get the application back to a working state and may further include ensuring that metadata for the application, which may be stored on the backup and recovery system, is up to date. The private-network backup and recovery system may thereby be recovered automatically within the private network using the described techniques.

FIG. 1 illustrates an example of a computing environment 100 that supports disaster recovery for private-network data backup and recovery systems in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components. In some examples, the network 120 may be a private network. For example, the network 120 may be a private-network network 120 that may not be accessible by or itself be able to access the Internet or other networks, and hence may be referred to as a dark site or a dark network.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a VM). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples (e.g., if the network 120 is a public network), the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more VMs, the resources of which are made available to one or more client devices over a network (e.g., to one or more computing devices 115 over the network 120).

In some examples, the computing system 105 or aspects thereof may implement or be implemented by one or more VMs. The one or more VMs may run various applications, such as a database server, an application server, or a web server. For example, a server 125 may be used to host (e.g., create, manage) one or more VMs, and the computing system manager 160 may manage a virtualized infrastructure within the computing system 105 and perform management operations associated with the virtualized infrastructure. The computing system manager 160 may manage the provisioning of VMs running within the virtualized infrastructure and provide an interface to a computing device 115 interacting with the virtualized infrastructure. For example, the computing system manager 160 may be or include a hypervisor and may perform various VM-related tasks, such as cloning VMs, creating new VMs, monitoring the state of VMs, moving VMs between physical hosts for load balancing purposes, and facilitating backups of VMs. In some examples, the VMs, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. In some examples described herein, the DMS 110 may be referred to as a backup and recovery system. If the network 120 is a private network, the DMS 110 may in some cases operate on-premise within the private network.

A snapshot 135 of a computing object (e.g., a VM, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, VMs, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110.

In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some other examples described herein, the network 120 may be a private network 120, which may not include or be connected with the cloud environment 195, the Internet, or any other networks. In such cases, the DMS 110 may execute within the private network 120 and may be referred to as a private-network backup and recovery system. The private-network backup and recovery system in this example may manage backup and recovery tasks for a single client associated with the private network 120.

The backup and recovery system may operate on-premise at the client's data center or computing system 105, or elsewhere within the client's private network 120, among other possibilities. The client's private network 120 may not be accessible by or itself be able to access the Internet or other networks, and hence may be referred to as a dark site or dark network, in some examples. The inaccessibility of the private-network data backup and recovery system may present challenges in cases where the system becomes corrupted or otherwise requires recovery (e.g., during a disaster scenario). For example, if a disaster affects a customer's data center, the disaster may additionally impact the backup and recovery system. That is, the control plane itself may be down or unable to execute properly, which may hinder automatic recovery of the system, in some examples.

Techniques, systems, and devices described herein provide for recovery of a private network data backup and recovery system, including without intervention or other manual support by a provider of the data backup and recovery system or other entity outside the private network (e.g., a self-healing system, automated recovery). The recovery of the data backup and recovery system may be initiated by a command issued by the client or other entity within the private network, or in some cases the recovery of the data backup and recovery system may be initiated automatically (e.g., periodically or based on a trigger). The recovery may be performed in two phases. A first phase may include recovery of the infrastructure of the backup and recovery system. Infrastructure of the backup and recovery system may include, for example, one or more components (e.g., computing objects, containers, or the like) that are used to operate the backup and recovery system (e.g., used to execute one or more core services as well as applications provided by the backup and recovery system), along with the one or more core services provided by the backup and recovery system, or any combination thereof. A core service may be a service that can execute independently of any other services. The infrastructure components may be crash-consistent (e.g., able to resume operations without data inconsistencies or errors) based on the infrastructure components storing associated data locally (e.g., in an SQL database, or some other location within a same VM or other system that hosts the backup and recovery system). The infrastructure-level recovery may thereby include restarting the various infrastructure components and performing health checks. If a health check fails, the recovery may be stopped.

A second phase may include an application level recovery. The application level recovery may be performed after the infrastructure is recovered successfully. The application level recovery may include recovering individual services (e.g., applications) that are run by the backup and recovery system. Execution of these application level services may depend on one or more of the core services, which is why the application level recovery may be performed after successful recovery of the infrastructure. The application level recovery may be performed application-by-application and may include executing one or more jobs per application to get the application back to a working state and may further include ensuring that metadata for the application, which may be stored on the backup and recovery system, is up to date. The private-network backup and recovery system may thereby be recovered automatically within the private network using the described techniques.

Figure 2:
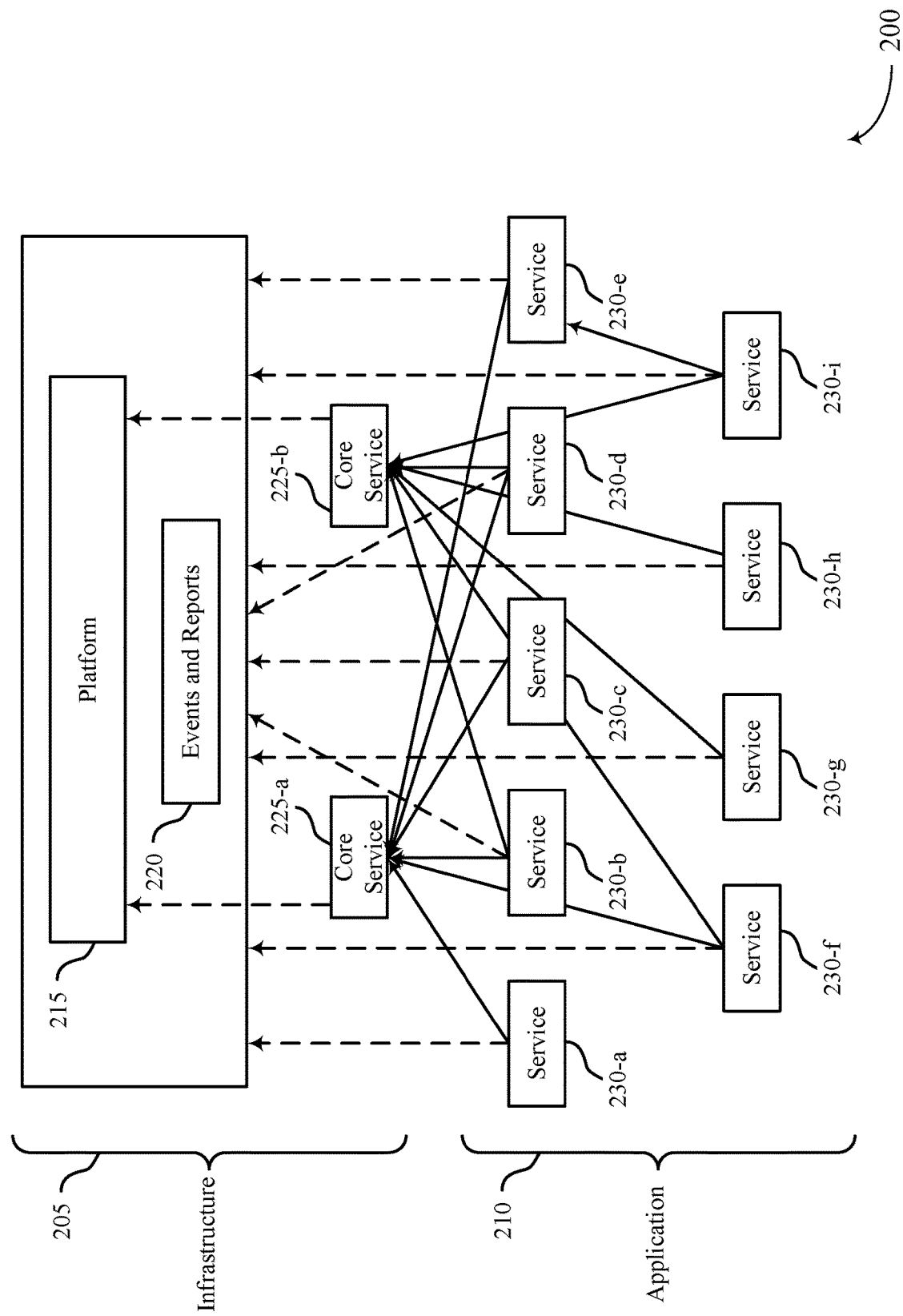
FIG. 2 shows an example of a backup and recovery system architecture that supports disaster recovery for private-network data backup and recovery systems in accordance with aspects of the present disclosure.

FIG. 2 shows an example of a backup and recovery system architecture 200 that supports disaster recovery for private-network data backup and recovery systems in accordance with aspects of the present disclosure. The backup and recovery system architecture 200 may implement or be implemented by aspects of the computing environment 100 as described with reference to FIG. 1. For example, the backup and recovery system architecture 200 illustrates an architecture of services and components within a backup and recovery system that operates on a private network, which may represent an example of the DMS 110 described with reference to FIG. 1.

The backup and recovery system may include an infrastructure level 205 and an application level 210. The infrastructure level 205 may correspond to an operational framework for the backup and recovery system. The infrastructure level 205 may include, for example, the platform 215 and the events and reports service 220, among other core components. The platform 215 and the events and reports service 220 may represent examples of core components of the backup and recovery system. Every application, service, and feature of the backup and recovery system may depend from or utilize data from the platform 215 and the events and reports service 220. The infrastructure level 205 may, in some examples, additionally include one or more core services 225, which may be referred to as microservices in some examples. The one or more core services 225 may include services of the backup and recovery system that are each operable to execute independently of other services of the backup and recovery system. For example, the core services 225-a and 225-b may depend on one or more of the core components for execution, but may not rely on any other services for execution.

The core services 225 may include, for example, a global service-level agreement (SLA) (e.g., that facilitates SLAs), a metadata synchronization (MDS) service (e.g., that supports synchronization of metadata from a data management cluster), a role-based access control (RBAC) service (e.g., that facilitates access and authorization of tenants), some other type of service, or any combination thereof. One or more other services of the backup and recovery system may rely on the core services 225 to properly authorize users, provide data, or the like before the other services are able to execute.

The application level 210 may correspond to data of the infrastructure level 205. The application level 210 may include, for example, one or more other services 230 (e.g., individual services or applications). Execution of these one or more application level services 230 may depend on one or more of the core services 225. The application level services 230 may obtain data from the core services 225, which is why the application level services 230 may be dependent on the core services 225. For example, the application level service 230-a may depend from the core service 225-a, because the application level service 230-a may not be able to execute properly if the core service 225-a is not functioning (e.g., if the core service 225-a is corrupted or otherwise inoperable). The application level services 230-b, 230-c, 230-d, 230-e, and 230-f may also depend at least partially on the core service 225-a (e.g., in addition to one or more other services and the platform 215). The application level services 230-b, 230-c, 230-d, 230-f, 230-g, 230-h, and 230-i may depend at least partially on the core service 225-b (e.g., in addition to one or more other services and the platform 215). The application level services 230 may thereby not be able to execute before the core services 225 are restored.

The application level services 230 may correspond to features of the backup and recovery system. For example, the application level services 230 may include services that improve the backup and recovery of client data, productivity platforms, databases that support various read and write performances, other applications, or any combination thereof. These services may call data from the core services 225, such as SLA information, access and authorization information, metadata, or other data. Thus, the application level services may depend from the core services 225.

The recovery of the private network backup and recovery system may be performed in two phases based on these dependencies between services. For example, the infrastructure level 205 services and components may be recovered in a first phase, and the application level 210 services may be recovered in a second phase after the first phase is completed successfully. The application level 210 may be recovered efficiently and accurately using the recovered infrastructure level 205 services and components. Techniques for recovering all of the services of the private network backup and recovery system are described in further detail elsewhere herein, including with reference to FIG. 3.

Figure 3:
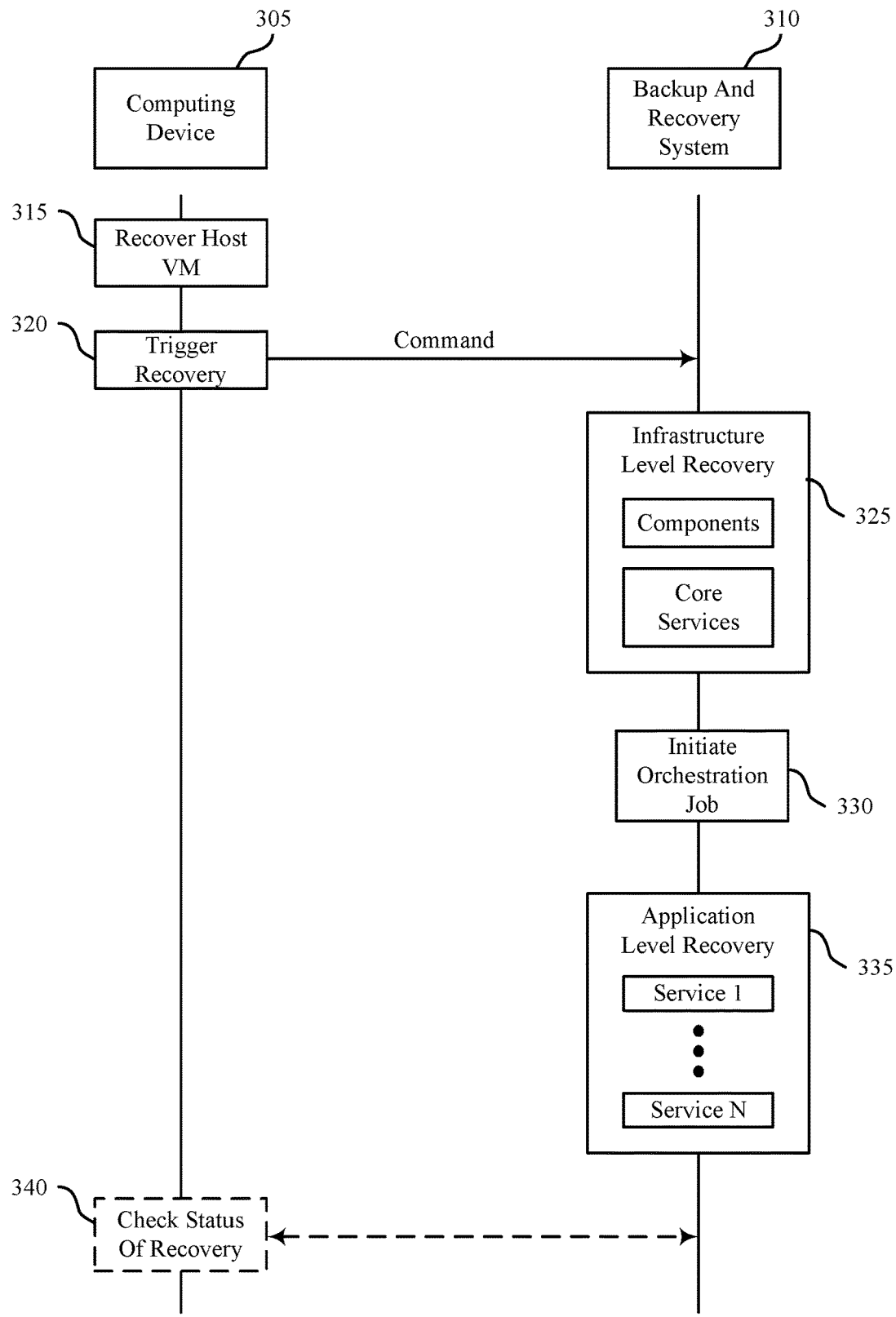
FIG. 3 shows an example of a flow diagram that supports disaster recovery for private-network data backup and recovery systems in accordance with aspects of the present disclosure.

FIG. 3 shows an example of a flow diagram 300 that supports disaster recovery for private-network data backup and recovery systems in accordance with aspects of the present disclosure. The flow diagram 300 may implement or be implemented by aspects of the computing environment 100 or the backup and recovery system architecture 200, as described with reference to FIGS. 1 and 2. For example, the flow diagram 300 illustrates a process for performing a recovery of a backup and recovery system 310 that executes within a client's private network, as described with reference to FIGS. 1 and 2. In this example, the client may initiate the two-phase recovery operation.

In some aspects, the operations illustrated in the flow diagram 300 may be performed by hardware (e.g., including circuitry, processing blocks, logic components, and other components), code (e.g., software or firmware) executed by a processor, or any combination thereof. For example, aspects of the flow diagram 300 may be implemented or managed by a backup and recovery system 310, a recovery component or some other software or application that is associated with data backup and recovery.

In the following description of the flow diagram 300, the operations by the computing device 305 and the backup and recovery system 310 may be performed in different orders or at different times. Some operations may also be left out of the flow diagram 300, or other operations may be added. Although the computing device 305 and the backup and recovery system 310 are shown performing the operations of the flow diagram 300, some aspects of some operations may also be performed by one or more other components or systems.

As described in further detail elsewhere herein, including with reference to FIG. 2, the backup and recovery system 310 (e.g., a private-network DMS) may execute on a host VM. During a disaster scenario (e.g., a crash, a ransomware attack, or the like), the VM that hosts the backup and recovery system 310 may crash or stop executing properly.

At 315, the VM that hosts the backup and recovery system 310 may be brought back up based on a snapshot that was taken of the host VM at some time prior to the disaster. The client (e.g., via the computing device 305) may initiate and/or facilitate the recovery of the host VM. In some examples, the host VM may be recovered from a snapshot stored at a database within the private network and external to the VM, or from a snapshot stored in an external database or some other location. The client may recover the VM, in some examples, in response to detecting a disaster event associated with the client's private network.

At 320, after recovering the host VM, the client may trigger recovery of the backup and recovery system 310 on the host VM. For example, the client may utilize the computing device 305 to transmit, to the backup and recovery system 310, a command that triggers the recovery. The command may be conveyed via a command line interface (CLI) (e.g., an RKCLI command, or some other type of command), or via some other interface between the computing device 305 and the backup and recovery system 310. A CLI may be a user interface used to run programs, manage computer files, and interact with the host VM and the backup and recovery system 310.

In some examples, the recovery of the backup and recovery system 310 may be triggered automatically (e.g., without the client transmitting the command). For example, the recovery may be triggered periodically according to a recovery periodicity, or at some configured time interval, or based on startup, or some other parameters. In some examples, the backup and recovery system 310 may periodically perform a synchronization check and may trigger the recovery based on a result of the synchronization check. If the recovery is triggered automatically, the client may refrain from transmitting the command.

After the recovery is triggered, the backup and recovery system 310 may pause execution of any jobs that are not in support of the recovery and that may alter metadata or data of services of the backup and recovery system 310. The backup and recovery system may pause execution of the other jobs for a duration of the recovery. That is, the jobs may resume after the recovery is complete. The pause of job execution may improve reliability and reduce complexity by refraining from writing additional metadata as the previous metadata is being recovered.

At 325, after the recovery is initiated, the backup and recovery system 310 (e.g., a controller or manager associated with the backup and recovery system 310) may perform a first phase of the recovery, which may be referred to as infrastructure level recovery. In some examples, a CLI may perform the first phase of the recovery. The CLI may monitor a status of infrastructure of the backup and recovery system 310. The infrastructure may include one or more components that operate the backup and recovery system 310 and one or more core services provided by the backup and recovery system 310, which may represent examples of the components (e.g., platform) and core services described with reference to FIG. 2.

As part of monitoring the status of the infrastructure, the CLI may check whether a planet container of the backup and recovery system 310 is up and running properly. The planet container may be, for example, the VM that hosts the backup and recovery system 310, the platform that hosts the backup and recovery system 310, a container for the backup and recovery system 310, some other component, or any combination thereof. The CLI may additionally check whether hostbins associated with the backup and recovery system 310 are available and executing properly.

In some examples, one or more of the components may be corrupt, or the components may be in a relatively inoperable state at a time that a snapshot of a VM was obtained, or both. If any of the components are not in an operable state, the CLI may restart the component (e.g., an orchestrated restart of the core components). If the restart is successful, the infrastructure level may be in a working state. If a restart of any one or more components fails, the system may be unable to run a workload, and the entire recovery process of the backup and recovery system may fail. If the components are restarted, one or more of the core services may additionally, or alternatively, be modified based on the component restarting.

After determining that the core components are executing successfully, after restarting the core components, or both, the CLI may perform one or more health checks for one or more core services of the backup and recovery system 310. In some examples, a health check may include the CLI bringing up a pod associated with each service and ensuring that the pod is able to turn on and respond to requests without crashing. The infrastructure level recovery may be complete after the health checks are performed. If any of the components do not restart successfully, if at least one of the health check fails, or both, the backup and recovery system 310 may end the recovery process. That is, the recovery may fail and may need to be restarted.

The infrastructure level components and core services that run the backup and recovery system 310 may be crash consistent (e.g., their data is able to remain consistent after a complete crash and restore from a backup). That is, the data associated with the core components and core services in the infrastructure level may be stored locally on the host VM (e.g., instead of elsewhere within the private network). For example, a structured query language (SQL) database, or some other core service, may store its tables and associated data or metadata locally, such that the backup and recovery system 310 may determine inconsistencies in the data and restore the services to a consistent state accordingly. The crash consistent property of the infrastructure level may be leveraged to perform the infrastructure level recovery using the restarts and health checks.

Other services of the backup and recovery system 310 may not be crash consistent, in some examples. For example, a backup of a database associated with one of the other services may be stored on a database that is external to the VM that hosts the backup and recovery system 310 (e.g., the snapshot may be stored) elsewhere within the private network. Thus, the backup and recovery system 310 may need to be made aware of the snapshots prior to recovery to ensure that there is consistency between the snapshots and the recovered data.

Although shown separately in FIG. 3, it is to be understood that, in some examples, the infrastructure level recovery may include the recovery of the VM that hosts the backup and recovery system 310. The infrastructure level recovery may be performed by any one or more components of the backup and recovery system 310. For example, the infrastructure level recovery may be performed by a CLI, a recovery manager, or some other component.

At 330, the backup and recovery system 310 may initiate an orchestration job. In some examples, the CLI may initiate the orchestration job based on the command received from the computing device 305 and based on the successful recovery of the infrastructure level. The orchestration job may, in some examples, execute using data associated with one or more of the core components or core services. The orchestration job may manage the second phase of the recovery of the backup and recovery system 310, which may be referred to as the application level recovery. The orchestration job may, in some examples, perform a preliminary check to ensure the core and platform services are running as expected.

At 335, the orchestration job may initiate and execute the application level recovery. That is, the orchestration job may start to recover, after the infrastructure is recovered, data associated with application level services provided by the backup and recovery system 310. The application level recovery may correspond to recovery of application level services of the backup and recovery system 310. The application level services may depend on at least one of the one or more core services for execution, as described in further detail elsewhere herein, including with reference to FIG. 2.

The orchestration job may schedule and execute multiple recovery jobs. Each recovery job may be application-specific. That is, engineers that design each service may design a respective recovery job. The recovery jobs may each support one or more common features. For example, each of the recovery jobs may include an application programming interface (API) that is able to be polled such that the orchestration job may react to any failures in the recovery job. Some of the recovery jobs may support making one or more API calls to core services that manage the data. Each of the recovery jobs may propagate events to a user interface as the recovery occurs, such that the computing device 305 may track progress of the recovery. The recovery jobs may additionally, or alternatively, be configured with or support a method for cleaning up the job in case the job fails. The recovery jobs may also include a maximum time limit for recovery. If the service is not recovered within the maximum time limit, the recovery job may exit. In some examples, the recovery job for a given service may include ensuring that metadata is up to date on the backup and recovery system and running a sanity check. In some examples, the metadata may need to be updated. Additionally, or alternatively, the metadata may automatically be up-to-date without further intervention.

After a service is recovered, the recovery job may, in some examples, run a health check to ensure that data and metadata of the service is consistent and the service is running as expected. For example, the recovery job may identify any snapshots associated with the service that may reside outside of the backup and recovery system 310, and the recovery job may reconstruct metadata based on the snapshot to ensure consistency. Additionally, or alternatively, the recovery job may remove snapshot data if the snapshot data does not have any corresponding metadata.

The orchestration job may schedule the execution of the recovery jobs in a sequential order based on dependencies between the services to ensure that the recovery is successful. For example, if a first application level service depends directly from a core service, the orchestration job may schedule a recovery of the first application level service before recovery of a second application level service that depends on one or more other application level services. As an example, the service 230-*i* illustrated in FIG. 2 may depend from the service 230-*e*, and the service 230-*e* may depend directly from the core service 225-*a* (e.g., the platform services). In this example, if the service 230-*i* is recovered before the service 230-*e*, the service 230-*i* may not be able to execute properly due to the dependency chain. The orchestration job may thereby schedule recovery of the service 230-*e* before recovery of the service 230-*i*.

The orchestration job may iterate sequentially via all services (e.g., components) of the backup and recovery system 310 based on their dependencies. The orchestration job may start a recovery job for each service in order (e.g., if a recovery job exists), and the recovery job may bring the service to a working state. The orchestration job may continue to execute recovery jobs sequentially until all services are operating in a working state (e.g., service 1 through service N).

At 340, in some examples, the client may check a status of the recovery. For example, the client may use the computing device 305 to send a request (e.g., via a CLI or other interface) to the backup and recovery system 310 for a status of the recovery. The backup and recovery system 310 (e.g., the CLI, the orchestration job, or some other component) may receive the request and output information that indicates the status of the recovery. The status may be, for example, a recovery started status, a deployment started status, a complete status, a failed status (e.g., recovery failed or deployment recovery failed), a pending status, some other status, or any combination thereof. The backup and recovery system 310 may, in some examples, additionally or alternatively output one or more messages in addition to the status. The messages may include information that explains the status and/or next steps for the client. The client may check the status at any time during the recovery. The backup and recovery system 310 may utilize one or more APIs or other interfaces to determine and output the status.

If any of the components or services fail to be recovered successfully, the backup and recovery system 310 may stop the recovery process and the recovery may fail. The backup and recovery system 310 may retry the process automatically, or the client may request a retry of the recovery process.

The backup and recovery system 310 may thereby support a self-recovery in two phases. The recovery may be performed automatically once triggered and may ensure that components and services are recovered in a certain order based on dependencies between the services. The described techniques may support improved reliability and recovery of private-network backup and recovery systems 310 that execute within a private network separate from the Internet or other networks.

Figure 4:
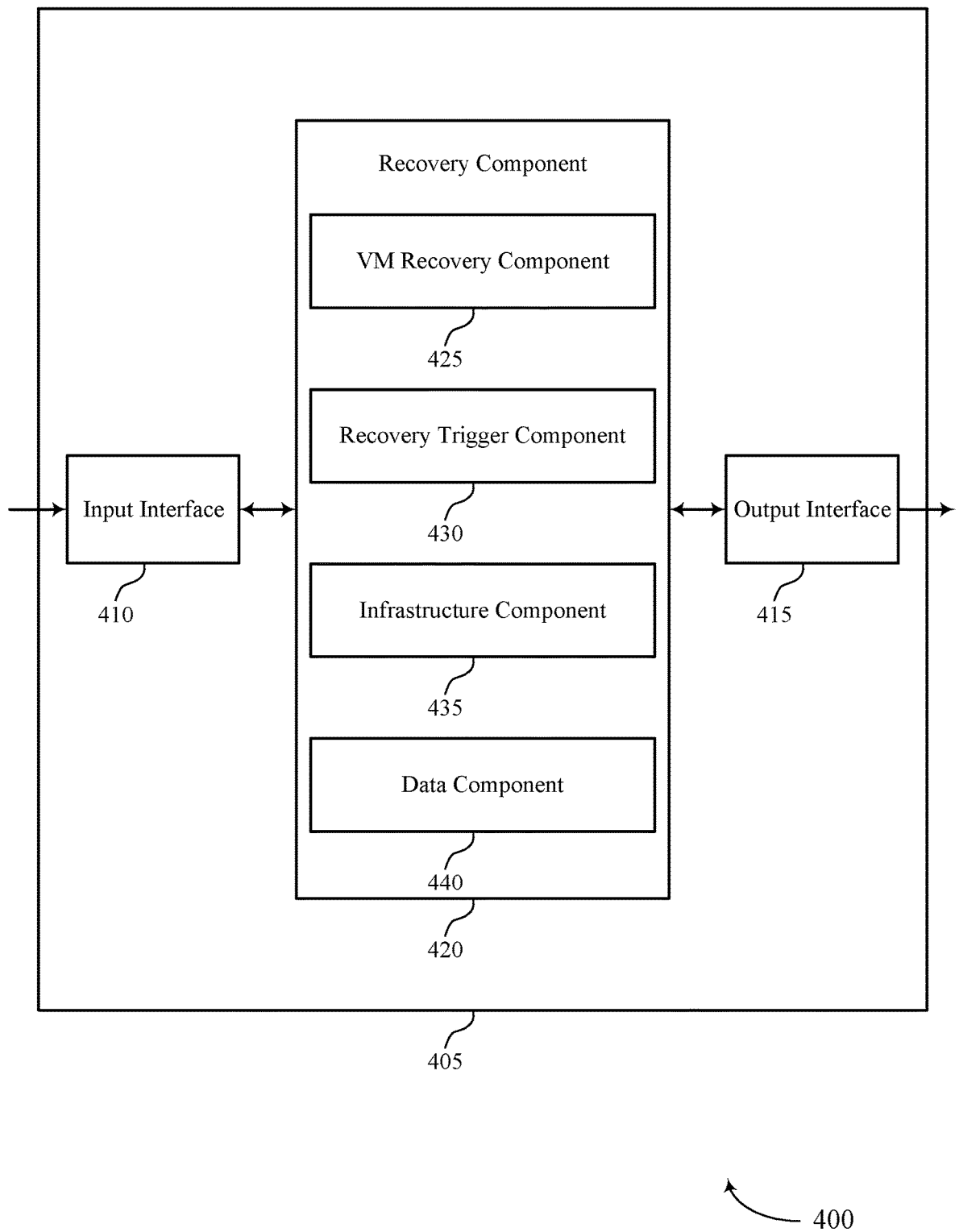
FIG. 4 shows a block diagram of an apparatus that supports disaster recovery for private-network data backup and recovery systems in accordance with aspects of the present disclosure.

FIG. 4 shows a block diagram 400 of a system 405 that supports disaster recovery for private-network data backup and recovery systems in accordance with aspects of the present disclosure. In some examples, the system 405 may be an example of aspects of one or more components described with reference to FIG. 1, such as a DMS 110. The system 405 may include an input interface 410, an output interface 415, and a recovery component 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the recovery component 420 to support disaster recovery for private-network data backup and recovery systems. In some cases, the input interface 410 may be a component of a network interface 625 as described with reference to FIG. 6.

The output interface 415 may manage output signaling for the system 405. For example, the output interface 415 may receive signaling from other components of the system 405, such as the recovery component 420, and may transmit such output signaling corresponding to (e.g., representative of or otherwise based on) such signaling to other systems or devices. In some cases, the output interface 415 may be a component of a network interface 625 as described with reference to FIG. 6.

For example, the recovery component 420 may include a VM recovery component 425, a recovery trigger component 430, an infrastructure component 435, a data component 440, or any combination thereof. In some examples, the recovery component 420, or various components thereof, may be configured to perform various operations (e.g., receiving, monitoring, transmitting) using or otherwise in cooperation with the input interface 410, the output interface 415, or both. For example, the recovery component 420 may receive information from the input interface 410, send information to the output interface 415, or be integrated in combination with the input interface 410, the output interface 415, or both to receive information, transmit information, or perform various other operations as described herein.

The VM recovery component 425 may be configured as or otherwise support a means for recovering, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM. The recovery trigger component 430 may be configured as or otherwise support a means for identifying, after recovering the VM, a trigger for recovery of the backup and recovery system. The infrastructure component 435 may be configured as or otherwise support a means for recovering, in response to the trigger, infrastructure of the backup and recovery system based on the snapshot, where the infrastructure includes one or more components that operate the backup and recovery system and one or more core services provided by the backup and recovery system, the one or more core services including services that are operable to execute independent of other services. The data component 440 may be configured as or otherwise support a means for recovering, after recovering the infrastructure of the backup and recovery system and based on the snapshot, data associated with one or more second services provided by the backup and recovery system, where the one or more second services depend on at least one of the one or more core services for execution.

Figure 5:
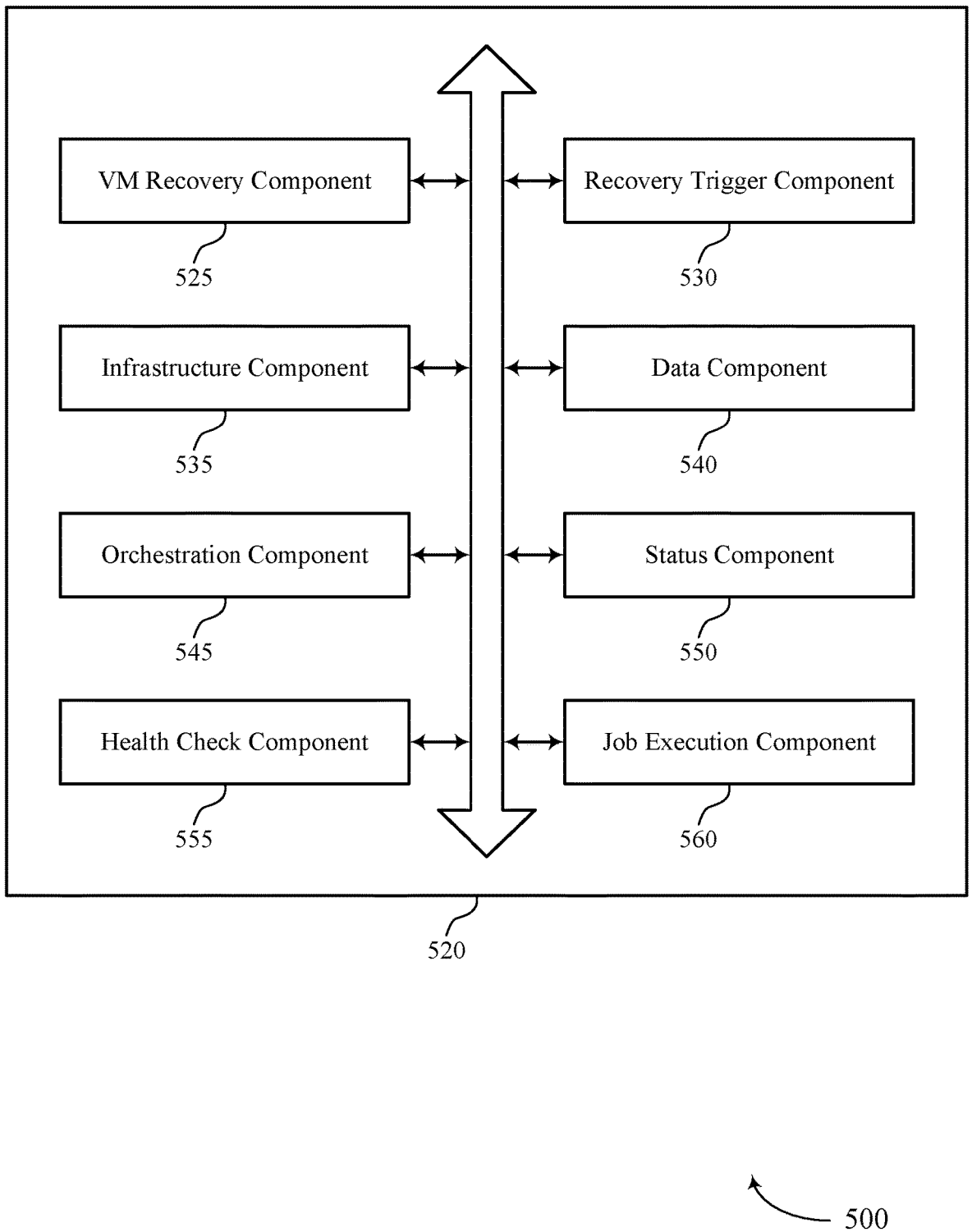
FIG. 5 shows a block diagram of a recovery component that supports disaster recovery for private-network data backup and recovery systems in accordance with aspects of the present disclosure.

FIG. 5 shows a block diagram 500 of a recovery component 520 that supports disaster recovery for private-network data backup and recovery systems in accordance with aspects of the present disclosure. The recovery component 520 may be an example of aspects of a recovery component or a recovery component 420, or both, as described herein. The recovery component 520, or various components thereof, may be an example of means for performing various aspects of disaster recovery for private-network data backup and recovery systems as described herein. For example, the recovery component 520 may include a VM recovery component 525, a recovery trigger component 530, an infrastructure component 535, a data component 540, an orchestration component 545, a status component 550, a health check component 555, a job execution component 560, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The VM recovery component 525 may be configured as or otherwise support a means for recovering, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM. The recovery trigger component 530 may be configured as or otherwise support a means for identifying, after recovering the VM, a trigger for recovery of the backup and recovery system. The infrastructure component 535 may be configured as or otherwise support a means for recovering, in response to the trigger, infrastructure of the backup and recovery system based on the snapshot, where the infrastructure includes one or more components that operate the backup and recovery system and one or more core services provided by the backup and recovery system, the one or more core services including services that are operable to execute independent of other services. The data component 540 may be configured as or otherwise support a means for recovering, after recovering the infrastructure of the backup and recovery system and based on the snapshot, data associated with one or more second services provided by the backup and recovery system, where the one or more second services depend on at least one of the one or more core services for execution.

In some examples, to support identifying the trigger, the recovery trigger component 530 may be configured as or otherwise support a means for receiving a command that triggers the recovery of the backup and recovery system.

In some examples, to support recovering the infrastructure of the backup and recovery system, the infrastructure component 535 may be configured as or otherwise support a means for determining whether the one or more components that operate the backup and recovery system are operational. In some examples, to support recovering the infrastructure of the backup and recovery system, the infrastructure component 535 may be configured as or otherwise support a means for restarting at least one component of the one or more components in response to determining that the at least one component is not operational.

In some examples, the health check component 555 may be configured as or otherwise support a means for performing one or more health checks for the one or more core services based on successfully restarting the at least one component, where recovering the data associated with the one or more second services is based on the one or more health checks succeeding for the one or more core services.

In some examples, the one or more components included in the infrastructure include a container that includes the backup and recovery system.

In some examples, to support recovering the data associated with the one or more second services, the orchestration component 545 may be configured as or otherwise support a means for executing a recovery orchestration job, where the recovery orchestration job sequentially schedules one or more recovery jobs for the one or more second services based on dependencies between the one or more second services.

In some examples, the one or more second services include at least a first subset of services and a second subset of services. In some examples, the first subset of services includes one or more services that depend on at least one of the one or more core services for execution. In some examples, the second subset of services includes one or more services that depend on at least one service from among the first subset of services and that further depend on at least one of the one or more core services for execution. In some examples, the recovery orchestration job schedules recovery jobs for the first subset of services before recovery jobs for the second subset of services based on the dependencies between the one or more second services.

In some examples, the orchestration component 545 may be configured as or otherwise support a means for executing the one or more recovery jobs for the one or more second services in a sequential order based on the recovery orchestration job. In some examples, to execute a recovery job of the one or more recovery jobs, the health check component 555 may be configured as or otherwise support a means for performing a health check for a respective second service. In some examples, to execute the recovery job, the data component 540 may be configured as or otherwise support a means for updating, based on the snapshot of the backup and recovery system, the data associated with the respective second service until the respective second service is executing successfully.

In some examples, updating the data associated with the respective second service is further based on a second snapshot of the data associated with the respective second service, the second snapshot stored in a second location external to the private network.

In some examples, the job execution component 560 may be configured as or otherwise support a means for pausing execution of one or more second jobs during execution of the recovery orchestration job and the one or more recovery jobs.

In some examples, a recovery job of the one or more recovery jobs provides an application programming interface, indicates one or more events via a user interface associated with the backup and recovery system, is associated with a maximum execution time period, or any combination thereof.

In some examples, the status component 550 may be configured as or otherwise support a means for receiving a request for a status of the recovery of the backup and recovery system. In some examples, the status component 550 may be configured as or otherwise support a means for outputting, via a user interface and during the recovery, information that indicates the status of the recovery of the backup and recovery system, where the status includes one of a complete status, a failure status, a pending status, or any combination thereof.

Figure 6:
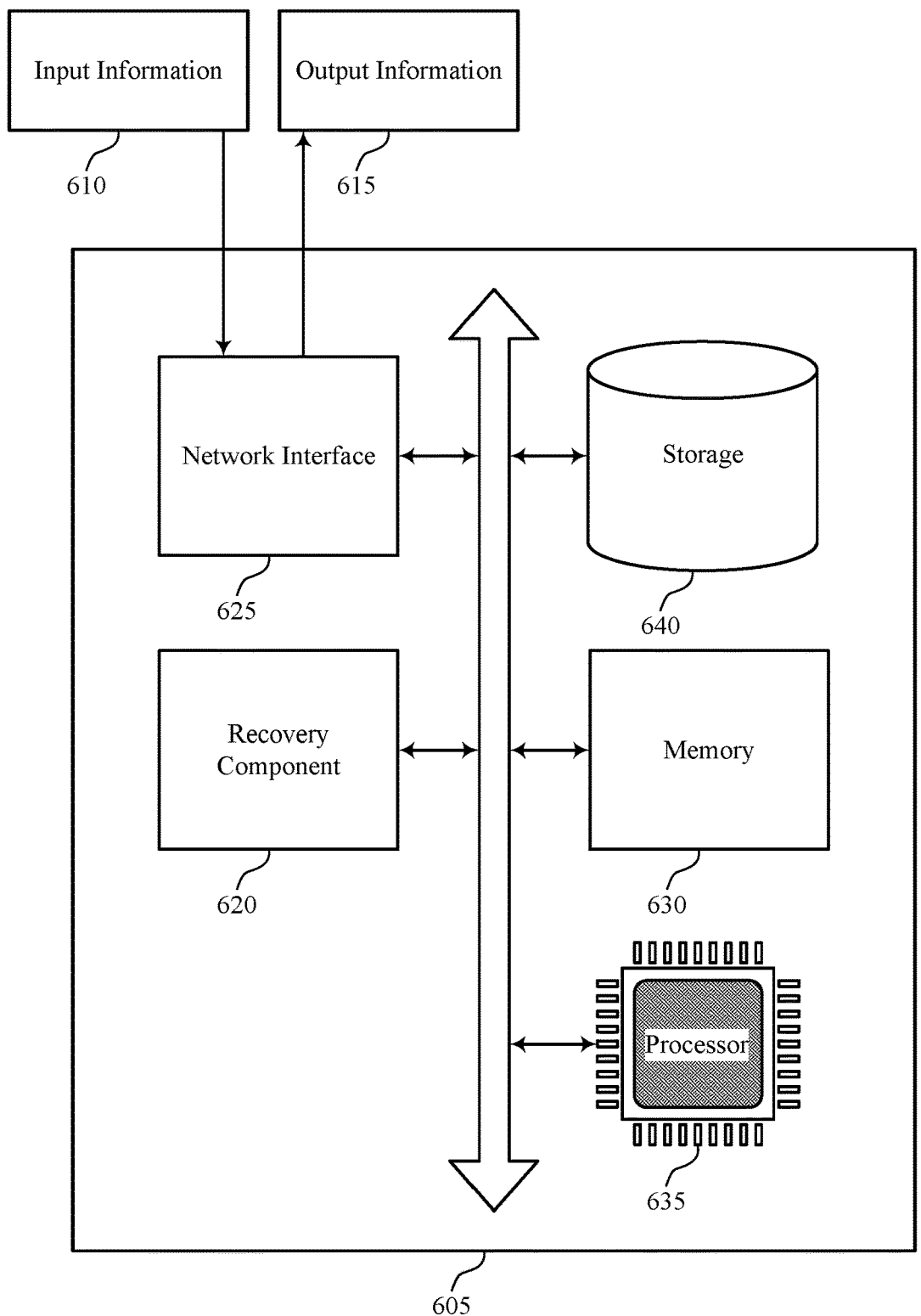
FIG. 6 shows a diagram of a system including a device that supports disaster recovery for private-network data backup and recovery systems in accordance with aspects of the present disclosure.

FIG. 6 shows a block diagram 600 of a system 605 that supports disaster recovery for private-network data backup and recovery systems in accordance with aspects of the present disclosure. The system 605 may be an example of or include the components of a system 405 as described herein. The system 605 may include components for data management, including components such as a recovery component 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically: via one or more buses, communications links, communications interfaces, or any combination thereof). Additionally, the components of the system 605 may include corresponding physical components or may be implemented as corresponding virtual components (e.g., components of one or more VMs). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting disaster recovery for private-network data backup and recovery systems). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the recovery component 620 may be configured as or otherwise support a means for recovering, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM. The recovery component 620 may be configured as or otherwise support a means for identifying, after recovering the VM, a trigger for recovery of the backup and recovery system. The recovery component 620 may be configured as or otherwise support a means for recovering, in response to the trigger, infrastructure of the backup and recovery system based on the snapshot, where the infrastructure includes one or more components that operate the backup and recovery system and one or more core services provided by the backup and recovery system, the one or more core services including services that are operable to execute independent of other services. The recovery component 620 may be configured as or otherwise support a means for recovering, after recovering the infrastructure of the backup and recovery system and based on the snapshot, data associated with one or more second services provided by the backup and recovery system, where the one or more second services depend on at least one of the one or more core services for execution.

By including or configuring the recovery component 620 in accordance with examples as described herein, the system 605 may support techniques for disaster recovery for private-network data backup and recovery systems, which may provide one or more benefits such as, for example, improved reliability, reduced latency, reduced power consumption, more efficient utilization of computing resources, network resources or both, and improved security, among other possibilities.

Figure 7:
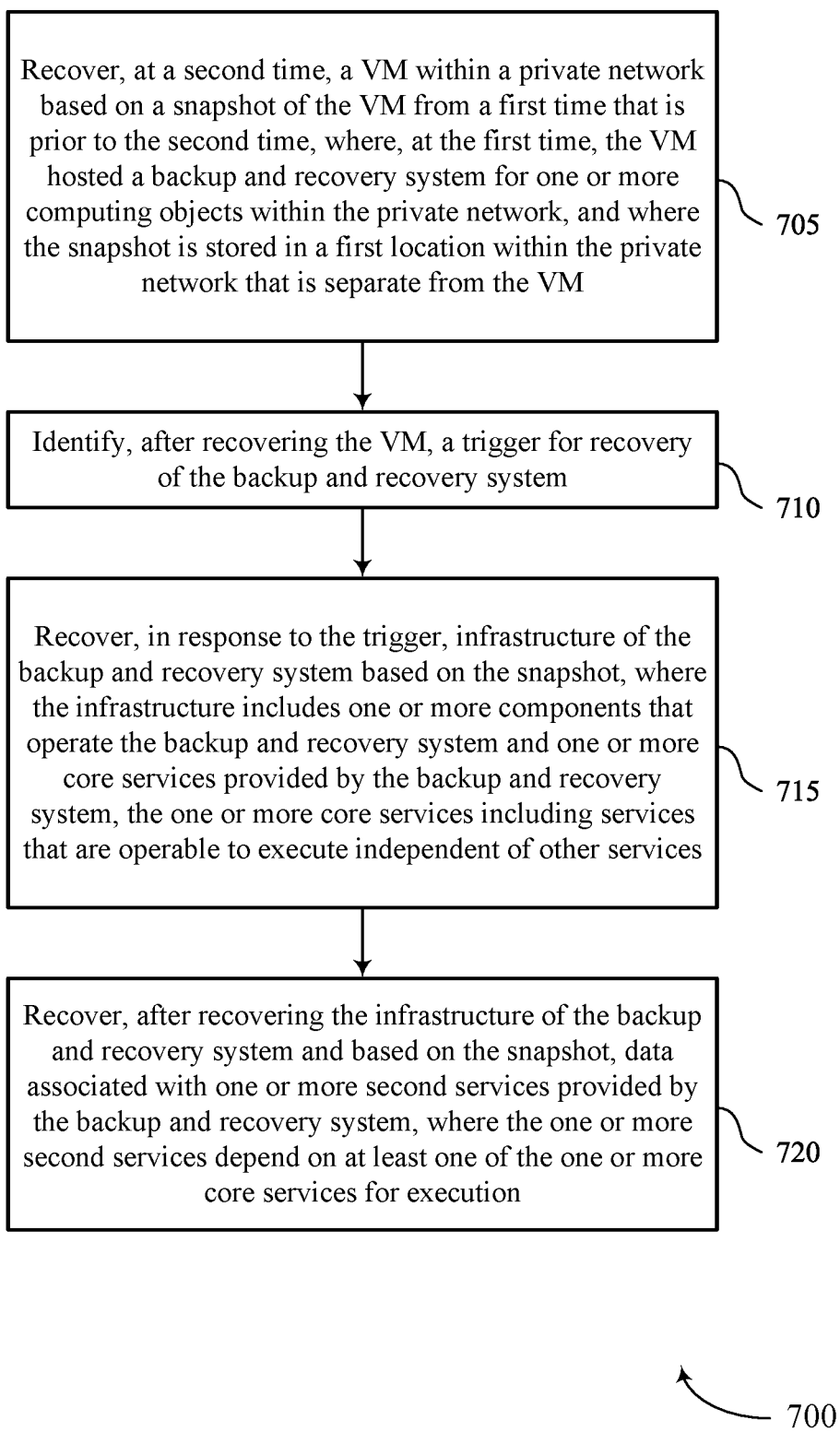
FIGS. 7 through 10 show flowcharts illustrating methods that support disaster recovery for private-network data backup and recovery systems in accordance with aspects of the present disclosure.

FIG. 7 shows a flowchart illustrating a method 700 that supports disaster recovery for private-network data backup and recovery systems in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include recovering, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM. The operations of block 705 may be performed in accordance with examples as disclosed herein. In some examples, aspects of the operations of 705 may be performed by a VM recovery component 525 as described with reference to FIG. 5.

At 710, the method may include identifying, after recovering the VM, a trigger for recovery of the backup and recovery system. The operations of block 710 may be performed in accordance with examples as disclosed herein. In some examples, aspects of the operations of 710 may be performed by a recovery trigger component 530 as described with reference to FIG. 5.

At 715, the method may include recovering, in response to the trigger, infrastructure of the backup and recovery system based on the snapshot, where the infrastructure includes one or more components that operate the backup and recovery system and one or more core services provided by the backup and recovery system, the one or more core services including services that are operable to execute independent of other services. The operations of block 715 may be performed in accordance with examples as disclosed herein. In some examples, aspects of the operations of 715 may be performed by an infrastructure component 535 as described with reference to FIG. 5.

At 720, the method may include recovering, after recovering the infrastructure of the backup and recovery system and based on the snapshot, data associated with one or more second services provided by the backup and recovery system, where the one or more second services depend on at least one of the one or more core services for execution. The operations of block 720 may be performed in accordance with examples as disclosed herein. In some examples, aspects of the operations of 720 may be performed by a data component 540 as described with reference to FIG. 5.

Figure 8:
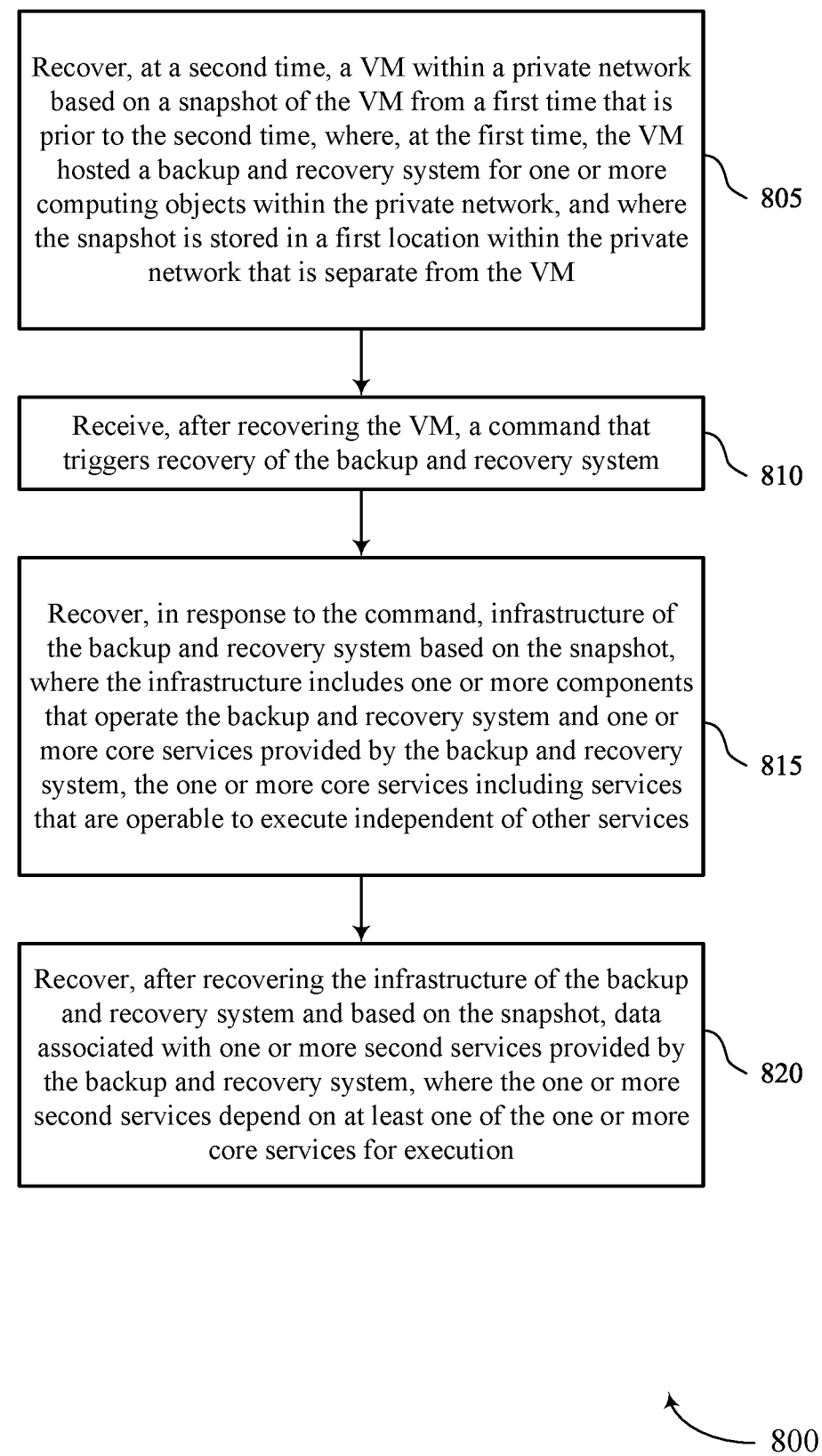

FIG. 8 shows a flowchart illustrating a method 800 that supports disaster recovery for private-network data backup and recovery systems in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include recovering, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM. The operations of block 805 may be performed in accordance with examples as disclosed herein. In some examples, aspects of the operations of 805 may be performed by a VM recovery component 525 as described with reference to FIG. 5.

At 810, the method may include the method may include receiving a command that triggers recovery of the backup and recovery system. The operations of block 810 may be performed in accordance with examples as disclosed herein. In some examples, aspects of the operations of 810 may be performed by a recovery trigger component 530 as described with reference to FIG. 5.

At 815, the method may include recovering, in response to the command, infrastructure of the backup and recovery system based on the snapshot, where the infrastructure includes one or more components that operate the backup and recovery system and one or more core services provided by the backup and recovery system, the one or more core services including services that are operable to execute independent of other services. The operations of block 815 may be performed in accordance with examples as disclosed herein. In some examples, aspects of the operations of 815 may be performed by an infrastructure component 535 as described with reference to FIG. 5.

At 820, the method may include recovering, after recovering the infrastructure of the backup and recovery system and based on the snapshot, data associated with one or more second services provided by the backup and recovery system, where the one or more second services depend on at least one of the one or more core services for execution. The operations of block 820 may be performed in accordance with examples as disclosed herein. In some examples, aspects of the operations of 820 may be performed by a data component 540 as described with reference to FIG. 5.

Figure 9:
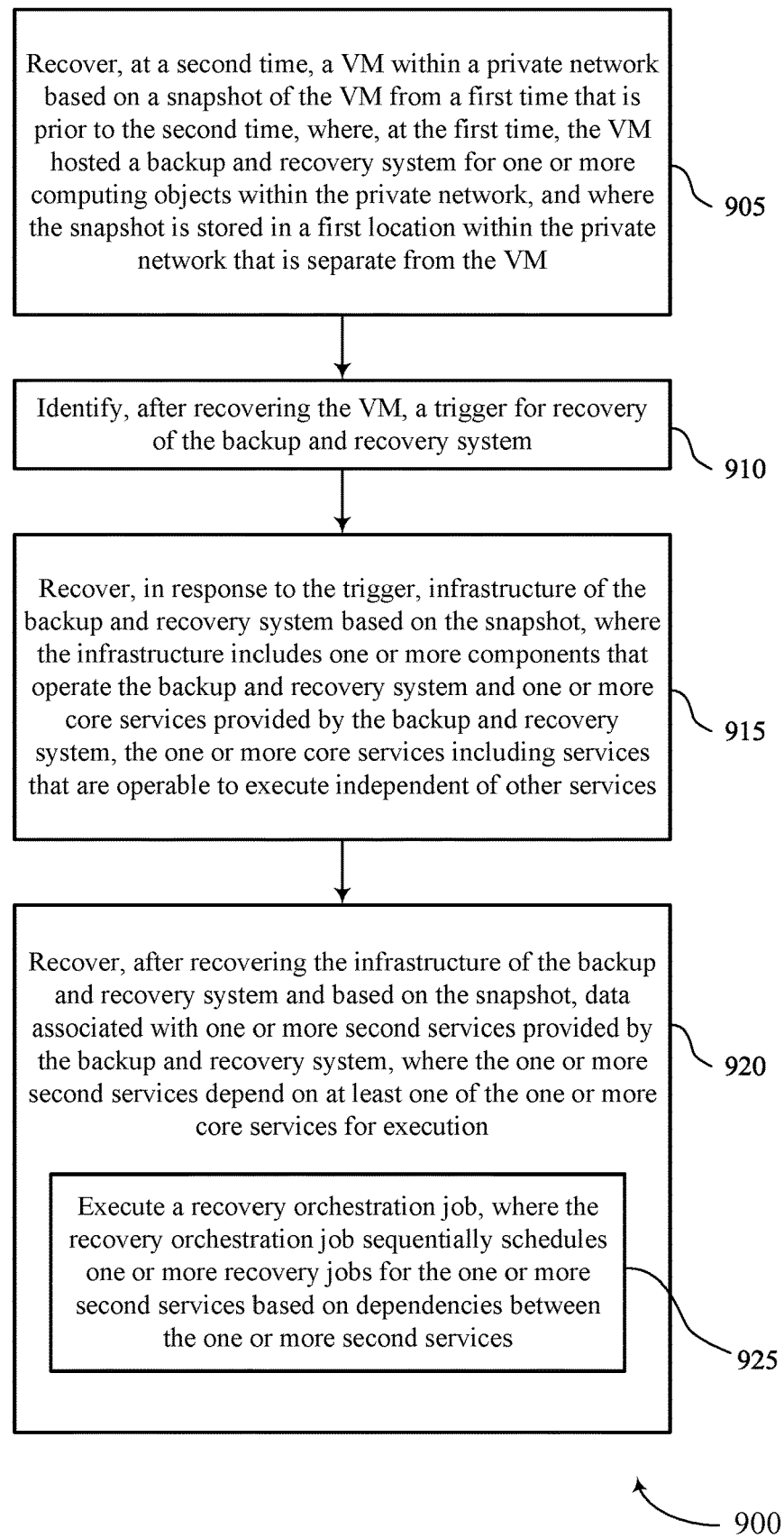

FIG. 9 shows a flowchart illustrating a method 900 that supports disaster recovery for private-network data backup and recovery systems in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include recovering, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM. The operations of block 905 may be performed in accordance with examples as disclosed herein. In some examples, aspects of the operations of 905 may be performed by a VM recovery component 525 as described with reference to FIG. 5.

At 910, the method may include identifying, after recovering the VM, a trigger for recovery of the backup and recovery system. The operations of block 910 may be performed in accordance with examples as disclosed herein. In some examples, aspects of the operations of 910 may be performed by a recovery trigger component 530 as described with reference to FIG. 5.

At 915, the method may include recovering, in response to the trigger, infrastructure of the backup and recovery system based on the snapshot, where the infrastructure includes one or more components that operate the backup and recovery system and one or more core services provided by the backup and recovery system, the one or more core services including services that are operable to execute independent of other services. The operations of block 915 may be performed in accordance with examples as disclosed herein. In some examples, aspects of the operations of 915 may be performed by an infrastructure component 535 as described with reference to FIG. 5.

At 920, the method may include recovering, after recovering the infrastructure of the backup and recovery system and based on the snapshot, data associated with one or more second services provided by the backup and recovery system, where the one or more second services depend on at least one of the one or more core services for execution. The operations of block 920 may be performed in accordance with examples as disclosed herein. In some examples, aspects of the operations of 920 may be performed by a data component 540 as described with reference to FIG. 5.

At 925, the method may include executing a recovery orchestration job, where the recovery orchestration job sequentially schedules one or more recovery jobs for the one or more second services based on dependencies between the one or more second services. The operations of block 925 may be performed in accordance with examples as disclosed herein. In some examples, aspects of the operations of 925 may be performed by an orchestration component 545 as described with reference to FIG. 5.

Figure 10:
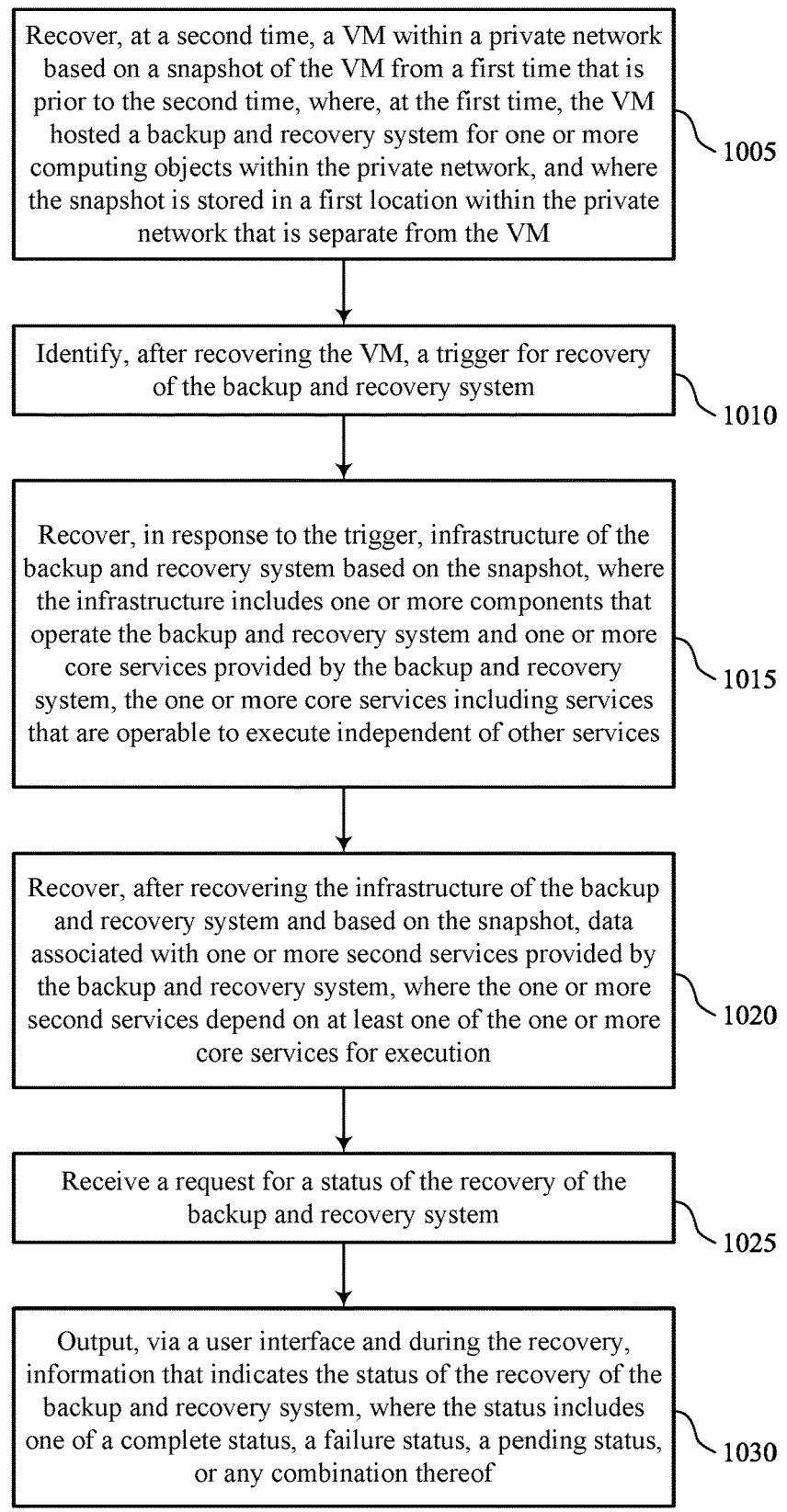

FIG. 10 shows a flowchart illustrating a method 1000 that supports disaster recovery for private-network data backup and recovery systems in accordance with aspects of the present disclosure. The operations of the method 1000 may be implemented by a DMS or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include recovering, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM. The operations of block 1005 may be performed in accordance with examples as disclosed herein. In some examples, aspects of the operations of 1005 may be performed by a VM recovery component 525 as described with reference to FIG. 5.

At 1010, the method may include identifying, after recovering the VM, a trigger for recovery of the backup and recovery system. The operations of block 1010 may be performed in accordance with examples as disclosed herein. In some examples, aspects of the operations of 1010 may be performed by a recovery trigger component 530 as described with reference to FIG. 5.

At 1015, the method may include recovering, in response to the trigger, infrastructure of the backup and recovery system based on the snapshot, where the infrastructure includes one or more components that operate the backup and recovery system and one or more core services provided by the backup and recovery system, the one or more core services including services that are operable to execute independent of other services. The operations of block 1015 may be performed in accordance with examples as disclosed herein. In some examples, aspects of the operations of 1015 may be performed by an infrastructure component 535 as described with reference to FIG. 5.

At 1020, the method may include recovering, after recovering the infrastructure of the backup and recovery system and based on the snapshot, data associated with one or more second services provided by the backup and recovery system, where the one or more second services depend on at least one of the one or more core services for execution. The operations of block 1020 may be performed in accordance with examples as disclosed herein. In some examples, aspects of the operations of 1020 may be performed by a data component 540 as described with reference to FIG. 5.

At 1025, the method may include receiving a request for a status of the recovery of the backup and recovery system. The operations of block 1025 may be performed in accordance with examples as disclosed herein. In some examples, aspects of the operations of 1025 may be performed by a status component 550 as described with reference to FIG. 5.

At 1030, the method may include outputting, via a user interface and during the recovery, information that indicates the status of the recovery of the backup and recovery system, where the status includes one of a complete status, a failure status, a pending status, or any combination thereof. The operations of block 1030 may be performed in accordance with examples as disclosed herein. In some examples, aspects of the operations of 1030 may be performed by a status component 550 as described with reference to FIG. 5.

A method by an apparatus is described. The method may include recovering, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM, identifying, after recovering the VM, a trigger for recovery of the backup and recovery system, recovering, in response to the trigger, infrastructure of the backup and recovery system based on the snapshot, where the infrastructure includes one or more components that operate the backup and recovery system and one or more core services provided by the backup and recovery system, the one or more core services including services that are operable to execute independent of other services, and recovering, after recovering the infrastructure of the backup and recovery system and based on the snapshot, data associated with one or more second services provided by the backup and recovery system, where the one or more second services depend on at least one of the one or more core services for execution.

An apparatus is described. The apparatus may include one or more memories storing processor executable code, and one or more processors coupled with the one or more memories. The one or more processors may individually or collectively operable to execute the code to cause the apparatus to recover, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM, identify, after recovering the VM, a trigger for recovery of the backup and recovery system, recover, in response to the trigger, infrastructure of the backup and recovery system based on the snapshot, where the infrastructure includes one or more components that operate the backup and recovery system and one or more core services provided by the backup and recovery system, the one or more core services including services that are operable to execute independent of other services, and recover, after recovering the infrastructure of the backup and recovery system and based on the snapshot, data associated with one or more second services provided by the backup and recovery system, where the one or more second services depend on at least one of the one or more core services for execution.

Another apparatus is described. The apparatus may include means for recovering, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM, means for identifying, after recovering the VM, a trigger for recovery of the backup and recovery system, means for recovering, in response to the trigger, infrastructure of the backup and recovery system based on the snapshot, where the infrastructure includes one or more components that operate the backup and recovery system and one or more core services provided by the backup and recovery system, the one or more core services including services that are operable to execute independent of other services, and means for recovering, after recovering the infrastructure of the backup and recovery system and based on the snapshot, data associated with one or more second services provided by the backup and recovery system, where the one or more second services depend on at least one of the one or more core services for execution.

A non-transitory computer-readable medium storing code is described. The code may include instructions executable by a processor to recover, at a second time, a VM within a private network based on a snapshot of the VM from a first time that is prior to the second time, where, at the first time, the VM hosted a backup and recovery system for one or more computing objects within the private network, and where the snapshot is stored in a first location within the private network that is separate from the VM, identify, after recovering the VM, a trigger for recovery of the backup and recovery system, recover, in response to the trigger, infrastructure of the backup and recovery system based on the snapshot, where the infrastructure includes one or more components that operate the backup and recovery system and one or more core services provided by the backup and recovery system, the one or more core services including services that are operable to execute independent of other services, and recover, after recovering the infrastructure of the backup and recovery system and based on the snapshot, data associated with one or more second services provided by the backup and recovery system, where the one or more second services depend on at least one of the one or more core services for execution.

In some examples of the method, apparatus, and non-transitory computer-readable medium described herein, identifying the trigger may include operations, features, means, or instructions for receiving a command that triggers the recovery of the backup and recovery system.

In some examples of the method, apparatus, and non-transitory computer-readable medium described herein, recovering the infrastructure of the backup and recovery system may include operations, features, means, or instructions for determining whether the one or more components that operate the backup and recovery system may be operational and restarting at least one component of the one or more components in response to determining that the at least one component may be not operational.

Some examples of the method, apparatus, and non-transitory computer-readable medium described herein may further include operations, features, means, or instructions for performing one or more health checks for the one or more core services based on successfully restarting the at least one component, where recovering the data associated with the one or more second services may be based on the one or more health checks succeeding for the one or more core services.

In some examples of the method, apparatus, and non-transitory computer-readable medium described herein, the one or more components included in the infrastructure include a container that includes the backup and recovery system.

In some examples of the method, apparatus, and non-transitory computer-readable medium described herein, recovering the data associated with the one or more second services may include operations, features, means, or instructions for executing a recovery orchestration job, where the recovery orchestration job sequentially schedules one or more recovery jobs for the one or more second services based on dependencies between the one or more second services.

In some examples of the method, apparatus, and non-transitory computer-readable medium described herein, the one or more second services include at least a first subset of services and a second subset of services, the first subset of services includes one or more services that depend on at least one of the one or more core services for execution, the second subset of services includes one or more services that depend on at least one service from among the first subset of services and that further depend on at least one of the one or more core services for execution, and the recovery orchestration job schedules recovery jobs for the first subset of services before recovery jobs for the second subset of services based on the dependencies between the one or more second services.

Some examples of the method, apparatus, and non-transitory computer-readable medium described herein may further include operations, features, means, or instructions for executing the one or more recovery jobs for the one or more second services in a sequential order based on the recovery orchestration job, where executing a recovery job of the one or more recovery jobs includes, performing a health check for a respective second service, and updating, based on the snapshot of the backup and recovery system, the data associated with the respective second service until the respective second service may be executing successfully.

Some examples of the method, apparatus, and non-transitory computer-readable medium described herein may further include operations, features, means, or instructions for updating the data associated with the respective second service may be further based on a second snapshot of the data associated with the respective second service, the second snapshot stored in a second location external to the private network.

Some examples of the method, apparatus, and non-transitory computer-readable medium described herein may further include operations, features, means, or instructions for pausing execution of one or more second jobs during execution of the recovery orchestration job and the one or more recovery jobs.

In some examples of the method, apparatus, and non-transitory computer-readable medium described herein, a recovery job of the one or more recovery jobs provides an application programming interface, indicates one or more events via a user interface associated with the backup and recovery system, may be associated with a maximum execution time period, or any combination thereof.

Some examples of the method, apparatus, and non-transitory computer-readable medium described herein may further include operations, features, means, or instructions for receiving a request for a status of the recovery of the backup and recovery system and outputting, via a user interface and during the recovery, information that indicates the status of the recovery of the backup and recovery system, where the status includes one of a complete status, a failure status, a pending status, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   recovering, at a second time and in response to an event associated with a private network, a virtual machine within the private network based at least in part on a snapshot of the virtual machine from a first time that is prior to the second time, wherein, at the first time, a backup and recovery system was hosted by the virtual machine, the backup and recovery system associated with backup and recovery of one or more computing objects within the private network, and wherein the snapshot is stored in a first location within the private network that is separate from the virtual machine;
   identifying, after recovering the virtual machine, a trigger for recovery of the backup and recovery system;
   recovering, in response to the trigger, infrastructure of the backup and recovery system based at least in part on the snapshot, wherein the infrastructure comprises one or more components that operate the backup and recovery system and one or more core services provided by the backup and recovery system, the one or more core services comprising services that are operable to execute independent of other services; and
   recovering, after recovering the infrastructure of the backup and recovery system and based at least in part on the snapshot, data associated with one or more second services provided by the backup and recovery system, wherein the one or more second services depend on at least one of the one or more core services for execution.

2. The method of claim 1, wherein identifying the trigger comprises:
   receiving a command that triggers the recovery of the backup and recovery system.

3. The method of claim 1, wherein recovering the infrastructure of the backup and recovery system comprises:
   determining whether the one or more components that operate the backup and recovery system are operational; and
   restarting at least one component of the one or more components in response to determining that the at least one component is not operational.

4. The method of claim 3, further comprising:
   performing one or more health checks for the one or more core services based at least in part on successfully restarting the at least one component, wherein recovering the data associated with the one or more second services is based at least in part on the one or more health checks succeeding for the one or more core services.

5. The method of claim 3, wherein the one or more components included in the infrastructure comprise a container that includes the backup and recovery system.

6. The method of claim 1, wherein recovering the data associated with the one or more second services comprises:
   executing a recovery orchestration job, wherein the recovery orchestration job sequentially schedules one or more recovery jobs for the one or more second services based at least in part on dependencies between the one or more second services.

7. The method of claim 6, wherein:
   the one or more second services comprise at least a first subset of services and a second subset of services;
   the first subset of services comprises one or more services that depend on at least one of the one or more core services for execution;

the second subset of services comprises one or more services that depend on at least one service from among the first subset of services and that further depend on at least one of the one or more core services for execution; and the recovery orchestration job schedules recovery jobs for the first subset of services before recovery jobs for the second subset of services based at least in part on the dependencies between the one or more second services.

8. The method of claim 6, further comprising:

executing the one or more recovery jobs for the one or more second services in a sequential order based at least in part on the recovery orchestration job, wherein executing a recovery job of the one or more recovery jobs comprises:

performing a health check for a respective second service; and updating, based at least in part on the snapshot of the backup and recovery system, the data associated with the respective second service until the respective second service is executing successfully.

9. The method of claim 8, wherein updating the data associated with the respective second service is further based at least in part on a second snapshot of the data associated with the respective second service, the second snapshot stored in a second location external to the private network.

10. The method of claim 6, further comprising:

pausing execution of one or more second jobs during execution of the recovery orchestration job and the one or more recovery jobs.

11. The method of claim 6, wherein a recovery job of the one or more recovery jobs provides an application programming interface, indicates one or more events via a user interface associated with the backup and recovery system, is associated with a maximum execution time period, or any combination thereof.

12. The method of claim 1, further comprising:

receiving a request for a status of the recovery of the backup and recovery system; and outputting, via a user interface and during the recovery, information that indicates the status of the recovery of the backup and recovery system, wherein the status comprises one of a complete status, a failure status, a pending status, or any combination thereof.

13. An apparatus, comprising:

one or more memories storing processor-executable code; and one or more processors coupled with the one or more memories and individually or collectively operable to execute the code to cause the apparatus to:

recover, at a second time and in response to an event associated with a private network, a virtual machine within the private network based at least in part on a snapshot of the virtual machine from a first time that is prior to the second time, wherein, at the first time, a backup and recovery system was hosted by the virtual machine, the backup and recovery system associated with backup and recovery of one or more computing objects within the private network, and wherein the snapshot is stored in a first location within the private network that is separate from the virtual machine;

identify, after recovering the virtual machine, a trigger for recovery of the backup and recovery system;

recover, in response to the trigger, infrastructure of the backup and recovery system based at least in part on the snapshot, wherein the infrastructure comprises one or more components that operate the backup and recovery system and one or more core services provided by the backup and recovery system, the one or more core services comprising services that are operable to execute independent of other services; and recover, after recovering the infrastructure of the backup and recovery system and based at least in part on the snapshot, data associated with one or more second services provided by the backup and recovery system, wherein the one or more second services depend on at least one of the one or more core services for execution.

14. The apparatus of claim 13, wherein the trigger comprises receipt of a command that triggers the recovery of the backup and recovery system.

15. The apparatus of claim 13, wherein, to recover the infrastructure of the backup and recovery system, the one or more processors are individually or collectively operable to execute the code to cause the apparatus to:

determine whether the one or more components that operate the backup and recovery system are operational; and restart at least one component of the one or more components in response to determining that the at least one component is not operational.

16. The apparatus of claim 15, wherein the one or more processors are individually or collectively further operable to execute the code to cause the apparatus to:

perform one or more health checks for the one or more core services based at least in part on successfully restarting the at least one component, wherein recovering the data associated with the one or more second services is based at least in part on the one or more health checks succeeding for the one or more core services.

17. The apparatus of claim 15, wherein the one or more components included in the infrastructure comprise a container that includes the backup and recovery system.

18. A non-transitory computer-readable medium storing code, the code comprising instructions executable by one or more processors to:

recover, at a second time and in response to an event associated with a private network, a virtual machine within the private network based at least in part on a snapshot of the virtual machine from a first time that is prior to the second time, wherein, at the first time, a backup and recovery system was hosted by the virtual machine, the backup and recovery system associated with backup and recovery of one or more computing objects within the private network, and wherein the snapshot is stored in a first location within the private network that is separate from the virtual machine;

identify, after recovering the virtual machine, a trigger for recovery of the backup and recovery system;

recover, in response to the trigger, infrastructure of the backup and recovery system based at least in part on the snapshot, wherein the infrastructure comprises one or more components that operate the backup and recovery system and one or more core services provided by the backup and recovery system, the one or more core services comprising services that are operable to execute independent of other services; and recover, after recovering the infrastructure of the backup and recovery system and based at least in part on the snapshot, data associated with one or more second services provided by the backup and recovery system, wherein the one or more second services depend on at least one of the one or more core services for execution.

19. The non-transitory computer-readable medium of claim 18, wherein the trigger comprises receipt of a command that triggers the recovery of the backup and recovery system.

20. The non-transitory computer-readable medium of claim 18, wherein, to recover the infrastructure of the backup and recovery system, the instructions are executable by the one or more processors to:
  determine whether the one or more components that operate the backup and recovery system are operational; and
  restart at least one component of the one or more components in response to determining that the at least one component is not operational.

* * * * *